May 11, 1926. 1,583,796
J. T. POPE
BEET TOPPER
Filed Sept. 13, 1924 4 Sheets-Sheet 1
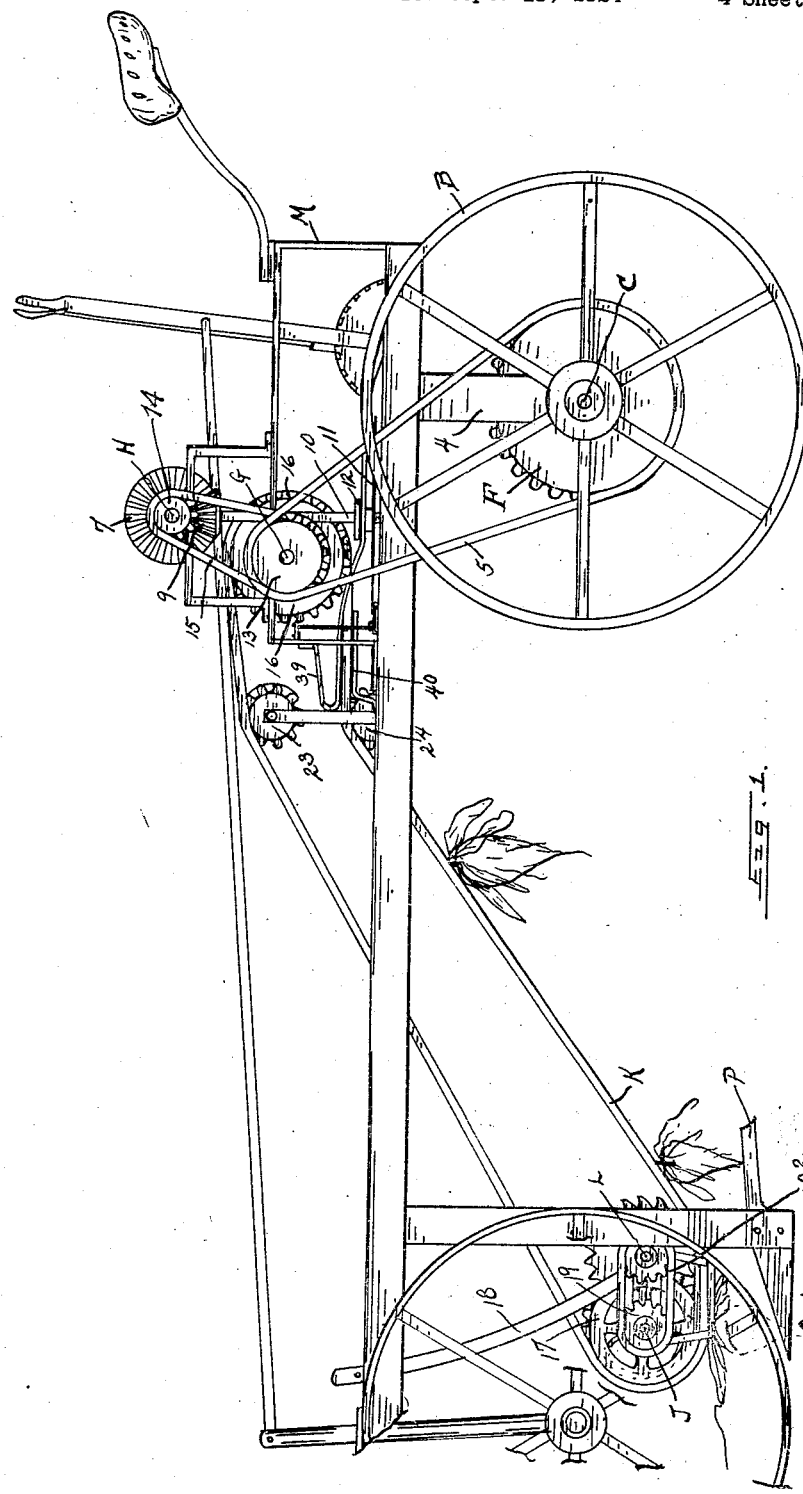

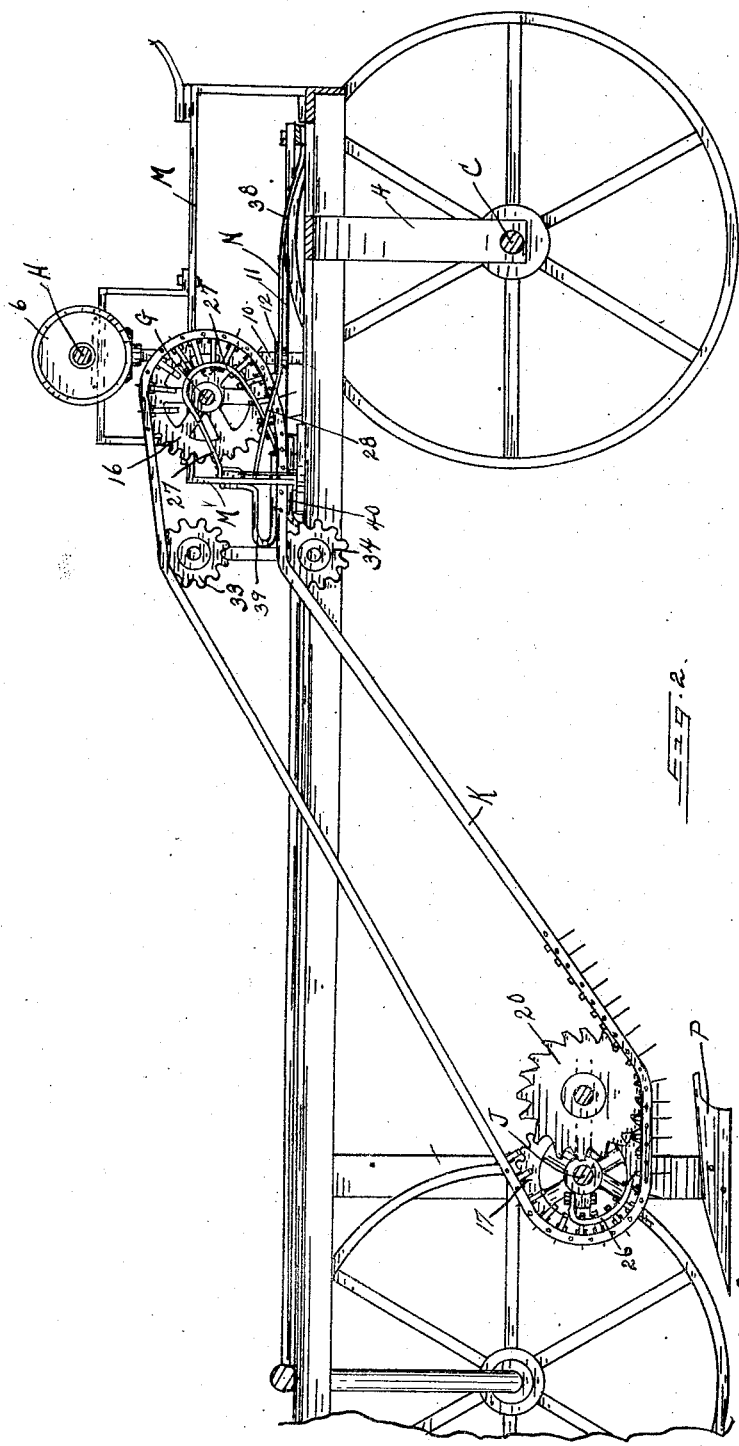

May 11, 1926.
J. T. POPE
BEET TOPPER
Filed Sept. 13, 1924
1,583,796
4 Sheets-Sheet 3
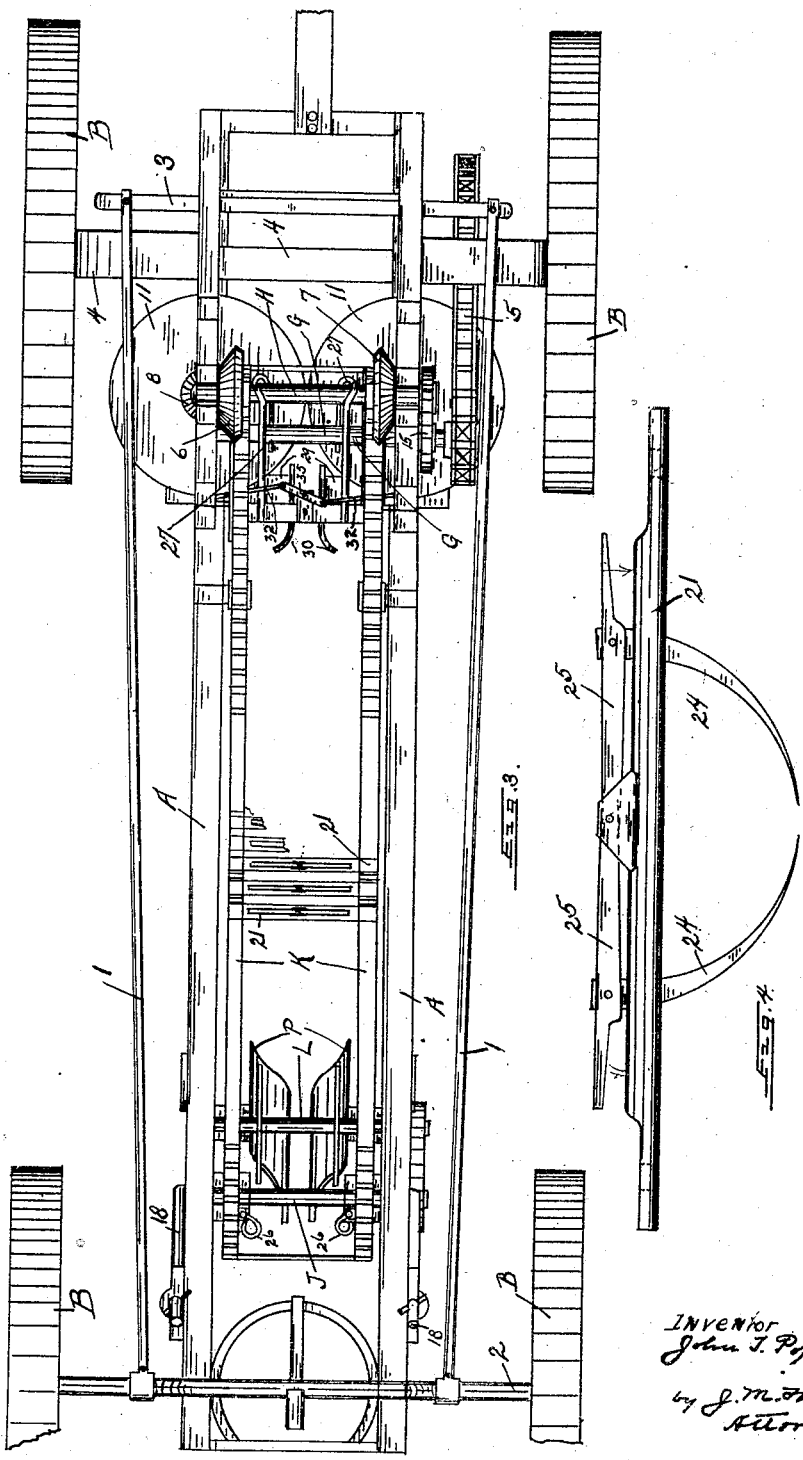

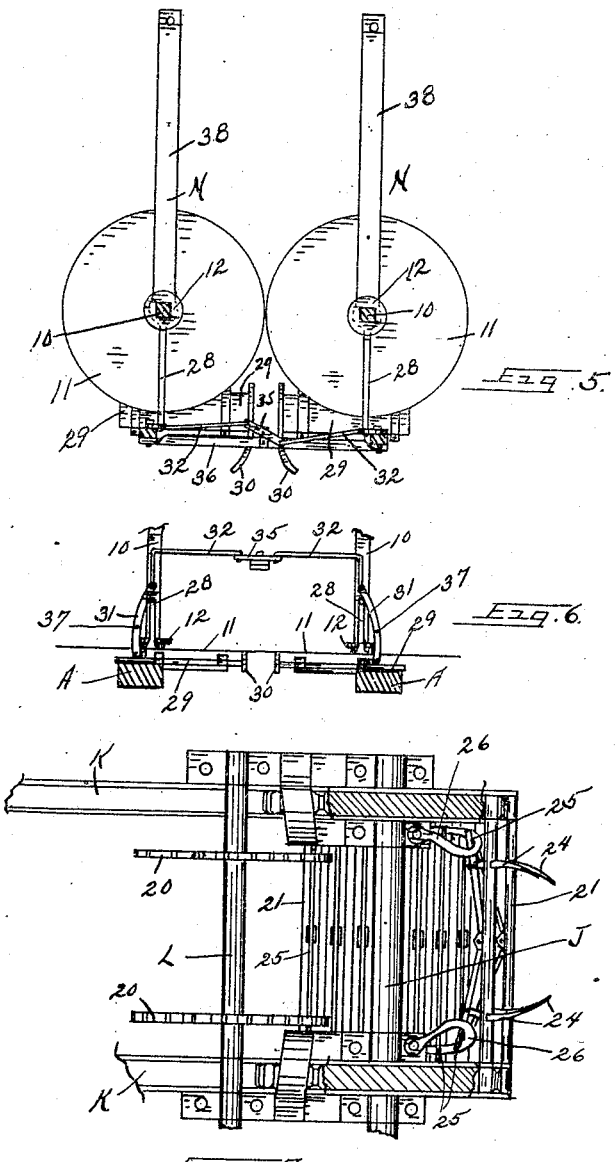

Patented May 11, 1926.

1,583,796

UNITED STATES PATENT OFFICE.

JOHN T. POPE, OF LAYTON, UTAH.

BEET TOPPER.

Application filed September 13, 1924. Serial No. 737,548.

My invention relates to beet harvesting machines, and has for its object to provide a beet topper which will engage the beets when loosened in the soil and raise them out of the ground and move the topping disks vertically to sever the crown of the beet from its body at the desired place to remove the foliage.

These objects I accomplish with the machine illustrated in the accompanying drawings, in which similar letters and numerals of reference indicate like parts throughout the several views, and as described in the specification forming a part of this application and pointed out in the appended claims.

In the drawings in which I have shown a substantial embodiment of my invention and the best manner of constructing my machine, Figure 1 is a side elevation of the machine, parts cut away. Figure 2 is a vertical longitudinal section of the machine, showing the beet engaging elements. Figure 3 is a plan view of the machine, showing a portion of the beet carrying chain. Figure 4 is an elevation of one pair of beet hooks and the cross tie of the beet carrying chain in which said hooks are mounted, enlarged from the other views. Figure 5 is a plan view showing the cutting disks and beet adjusting elements. Figure 6 is a rear elevation of one of the chain carrying elements. Figure 7 is a fragmentary plan showing one end portion of the beet carrying chain and the operating of the guide rods.

One of the difficulties in mechanically topping beets, is positioning the individual beet relative to the topping element so that the crown of the beet will be cut off at a point calculated to save all of the sugar contents of each beet, and I have solved this difficulty by my machine, which consists of a frame A, which is mounted on wheels B, with the front wheels journalled on a U-shaped axle 2 which is provided with the old fifth-wheel guiding connection with said frame A. Connecting members 1 are pivoted, to the front axle 2, and to a foot lever 3, which in turn is pivoted at the rear of the machine on the frame A, and is shifted by the feet of the operator. The rear axle C of the machine is straight and is passed through the U-shaped support 4 to which the rear end of said frame A is secured. A driving sprocket wheel F is secured on said rear axle C, by which the traction power of the rear wheels is imparted to the shaft G, by the chain 5. A counter shaft H is mounted above said shaft G, and on the said counter shaft are secured the bevel gears 6 and 7 with their respective teeth meshing with the teeth of bevel pinions 8 and 9, each of which is secured on a vertical square shaft 10; on the lower end of each of which are carried the respective disks 11. On the upper face of each of the respective disks 11 is secured a collar 12 having a square opening which allows vertical movement on the respective shafts 10. A sprocket wheel 13 is secured on said shaft G and a sprocket wheel 14 which is secured on the counter shaft H carries another chain 15 by which the counter shaft H is rotated and power imparted to said disks 11. A pair of sprocket wheels 16 are also secured on said shaft G by which the motion of said shaft is imparted to another shaft J by the beet carrying chain K. The said shaft J which is operated by two sprocket wheels 17 is journalled in bearing standards 18 that are suspended from said frame A. A sprocket wheel 19 is also secured on said shaft J. A pair of pressure disks 20 are secured on another counter shaft L which disks are to engage with the cross levers 25 of the said chain K, and motion is imparted from said sprocket wheel 19 to the said shaft and disks by the chains 22. Idler sprocket wheels 33 and 34 are mounted on stub shafts secured to the said frame A over which the said chain K is operated. The cross pieces 21 are secured near their ends to the chain K and each is longitudinally slotted to receive portions of the beet hooks 24, which are secured at their upper ends to the cross levers 25, which levers are pivoted at one end to the respective cross pieces 21. On the bearings in which the shaft J is journalled, are two guide rods 26 which are curved and bent to first engage under the free ends of said cross levers 25 to insure that their connected hooks 24 are open and ready to engage with a beet, and then as the chain K is caused to travel around the sprocket wheels 17 said cross levers will pass off of the guide rods 26 and allow the pressure disks 20 to engage the said cross levers 25 and force the hooks 24 into the crown of the beets. A pair of guide rods 27 are secured on the seat frame M which act similar to but in the reverse way to the guide rods 26 and on the same frame M is fastened one end of each of the disk regulators N, with one portion bifurcated to engage with the collars 12, and with the front ends free. On the upper side of the frame A are two slidable plates 29 having on their adjacent ends beet sizing shoes 30. On the upper face of each of said plates 29 is pivoted a curved lever 31 the upper end of each of said levers engaging the free end of the disk regulator N, and to the upper ends of the levers 31 are pivoted the cross adjusting rods 32, the adjacent ends of which are pivoted to the connecting link 35, which is supported by the cross brace 36.

The operation of my machine is as follows:—When the machine is drawn along and over a row of beets the plows P, of any of the well known makes will cut the main roots of the beets and loosen the soil and raise the beets and contiguous soil about one inch. As the cross pieces 21 of the chain K, engage the teeth of the sprocket wheels 17 the cross levers 25 will have their free ends engaged by the guide rods 26, and the hooks 24 will be held open, as shown in Figure 7. When the chain K has advanced or been moved by said sprocket wheels 17 far enough to slip the free ends of the cross levers 25 off of the said guide rods 26 the hooked shaped teeth of the pressure disks 20 will engage the upper side of the free end portion of said cross levers 25 and press ends downwardly into the position shown in Figure 4 and force the two hooks 24 downwardly and their points toward each other into any beet which may be adjacent said hooks. If there should not be any beet the points of the hooks will be driven through the soil. The said cross pieces 21 are spaced about two inches apart, in order that a pair of said hooks will be driven downwardly every two inches of the travel of the machine. The cross pieces, 21, cross levers 25 and the hooks 24 will remain in the position shown in Figure 4 while the chain is advanced up the incline and over the idler sprockets 34. When the chain K has brought the cross levers 25 into engagement with the guide rods 27, said guide rods 27 will engage the under side of the free end of said cross levers 25 and raise the free end of each cross lever and thereby the hooks 24 will be withdrawn from their engagement in the crown of the individual beet. In the meanwhile and before the beet crown has been freed from the hooks 24 any beet carried by said chain K and the hooks 24 will pass between the sizing shoes 30, and the passing of any beet by said shoes will move the plates 29 laterally apart, and as the plates are thus moved the curved levers 31 will be moved on their pivots 37, and the upper and curved portions will engage over the free ends of the regulators N, and said regulators N will be pushed downwardly, and thereby the topping disks 11. The vertical position of the disks 11, when the individual beet is topped thereby, is relative to the size of the beet, a large beet passing between the sizing shoes 30, will cause the disks 11 to be lower than the passing of a small beet through the said shoes, while the spring portion 38 of the regulators N will return said disks 11 to their normal vertical position, which is for topping the smallest beet that is marketable. Guide bars 39 and 40 are provided to prevent the bodies of the beets from lateral tipping when the beets pass between the shoes 30.

Having thus described my invention and its operation I desire to secure by Letters Patent and claim:—

1. In a beet harvester a frame mounted on wheels; a beet moving chain carried over sprocket wheels mounted on said frame; cross pieces on said chain longitudinally slotted to allow curved hooks to be operated therein; cross levers pivoted medially on said cross pieces; a curved hook on each of said cross levers adapted to operate in the slots of said cross pieces; and means to raise and lower the free ends of said levers as said chain is carried over said sprocket wheels.

2. In a beet harvester a frame mounted on wheels; a beet moving chain carried over sprocket wheels mounted on said frame; cross pieces on said chain longitudinally slotted to allow curved hooks to be operated therein; cross levers pivoted medially on said cross pieces; a curved hook on each of said cross levers adapted to operate in the slots of said cross pieces; and means to raise and lower the free ends of said levers as said chain is carried over said sprocket wheels, said means consisting of curved guide rods and pressure disks.

3. In a beet harvester a frame mounted on wheels; a beet moving chain carried over sprocket wheels mounted on said frame; spaced apart cross pieces forming a portion of said chain and having longitudinally disposed slots therein; cross levers pivoted on said cross pieces; a curved hook on each of said levers and adapted to operate within said slots; two pressure disks mounted on the front end of said frame and adapted to bear down on the free end of said cross levers after said chain has passed over the sprocket wheels adjacent, to drive the points of said hooks into beet crowns; and two guide rods secured near the rear end of said frame adapted to raise the free end of said cross levers and thereby to release said hooks from their engagement with said beet crowns.

4. A beet topper comprising a frame mounted on wheels; a beet moving chain operated over two pairs of sprocket wheels which are mounted on said frame; cross levers carried on said chain; a curved hook on each lever with their points directed toward each other; pressure disks adapted to engage said levers to drive said hooks into beets over which said chain is passing; topping disks and means to raise the free ends of said levers to remove said hooks from the crowns of beets after they pass the topping disks.

In testimony whereof I have affixed my signature.

JOHN T. POPE.